US008682830B2

(12) United States Patent   (10) Patent No.: US 8,682,830 B2
Tateno   (45) Date of Patent: Mar. 25, 2014

(54) INFORMATION PROCESSING APPARATUS, INFORMATION PROCESSING METHOD, AND PROGRAM

(75) Inventor: Kei Tateno, Tokyo (JP)

(73) Assignee: Sony Corporation, Tokyo (JP)

( * ) Notice: Subject to any disclaimer, the term of this patent is extended or adjusted under 35 U.S.C. 154(b) by 313 days.

(21) Appl. No.: 13/112,206

(22) Filed: May 20, 2011

(65) Prior Publication Data

US 2011/0295787 A1   Dec. 1, 2011

(30) Foreign Application Priority Data

May 31, 2010 (JP) ................ P2010-124183

(51) Int. Cl.
 G06F 17/10 (2006.01)
 G06F 17/20 (2006.01)
 G06F 17/30 (2006.01)
(52) U.S. Cl.
 USPC ................ 706/46; 706/21; 706/25
(58) Field of Classification Search
 USPC ........................................ 706/46
 See application file for complete search history.

(56) References Cited

U.S. PATENT DOCUMENTS

2003/0101166 A1* 5/2003 Uchino et al. ............. 707/2
2010/0030764 A1 2/2010 Koren

FOREIGN PATENT DOCUMENTS

JP 2010-124183 6/2010

OTHER PUBLICATIONS

Kobayashi et al., "Opinion Mining from Web Documents: Extraction and Structurization," Journal of the Japanese Society for Artificial Intelligence, 2007, pp. 227-238, vol. 22, No. 2, Japan.
Nasukawa et al., "Sentiment Analysis: Capturing Favorability Using Natural Language Processing," Proceedings of International Conference on Knowledge Capture, 2003.
Yehuda Koren, "Factorization Meets the Neighborhood: a Multifaceted Collaborative Filtering Model," Proceedings of Internaional Conference on Knowledge Discovery and Data Mining, 2008.
C.M. Bishop, "Pattern Recognition and Machine Learning," Springer-Verlag, 2006.

* cited by examiner

Primary Examiner — Jeffrey A Gaffin
Assistant Examiner — Nathan Brown, Jr.
(74) Attorney, Agent, or Firm — Finnegan, Henderson, Farabow, Garrett & Dunner, LLP (57) ABSTRACT

Disclosed herein is an information processing apparatus including an evaluation information extraction section configured to extract evaluation information including an object targeted to be evaluated and an evaluation of the object targeted to be evaluated from a linguistic expression given as information expressed linguistically by a user of interest; an identification section configured to identify whether the evaluation information is of a first type regarding content or of a second type regarding another user; and an evaluation prediction section configured to predict the evaluation by the user of interest regarding the content, based on the evaluation information of the first type given by the user of interest and on the evaluation information given by the other user in the evaluation information of the second type given by the user of interest.

8 Claims, 8 Drawing Sheets

| USER | BLOG TOP PAGE |
|---|---|
| USER 1 | http://blog.example.com/user1/ |
| USER 2 | http://blog.example.com/user2/ |
| USER 3 | http://blog.example.com/user3/ |
| ... | ... |

FIG.5

| LINGUISTIC EXPRESSION ID | USER | LINGUISTIC EXPRESSIONS |
|---|---|---|
| http://blog.example.com/user1/entry-1.html | USER 1 | ARTIST A'S SONG A IS FABULOUS |
| http://blog.example.com/user1/entry-2.html | USER 1 | <a href=http:/blog. example.com/user3/entry-1.html.>THIS POINT OF VIEW</a>IS PRETTY UNFAIR |
| http://blog.example.com/user1/entry-3.html | USER 1 | MR.USER 2 REALLY HAS A GOOD TASTE |
| http://blog.example.com/user2/entry-1.html | USER 2 | ALBUM A IS SUBLIME! |
| http://blog.example.com/user3/entry-1.html | USER 3 | SONG B IS JUST KID STUFF |
| ... | | ... |

F I G . 6

| EVALUATOR | EVALUATION EXPRESSION | EVALUATION FAVORABILITY | OBJECT TYPE | OBJECT TO BE EVALUATED |
|---|---|---|---|---|
| USER 1 | FABULOUS | POSITIVE | CONTENT | SONG A |
| USER 1 | UNFAIR | NEGATIVE | LINGUISTIC EXPRESSIONS | http://blog.example.com/user3/entry-1.html |
| USER 1 | GOOD | POSITIVE | PERSON | USER 2 |
| USER 2 | SUBLIME | POSITIVE | CONTENT | ALBUM A |
| USER 3 | KID STUFF | NEGATIVE | CONTENT | SONG B |
| ... | | | | |

FIG.7

| EVALUATOR | CONTENT | EVALUATION FAVORABILITY |
|---|---|---|
| USER 1 | SONG A | POSITIVE |
| USER 1 | SONG B | POSITIVE |
| USER 1 | ALBUM A | POSITIVE |
| USER 2 | ALBUM B | POSITIVE |
| USER 3 | SONG B | NEGATIVE |
| ... | | |

FIG.8

| REFERENCING USER | REFERENCED USER | EVALUATION FAVORABILITY |
|---|---|---|
| USER 1 | USER 2 | POSITIVE |
| ... | | |

FIG.9

| USER | PARAMETER | | | | |
| | 1 | 2 | 3 | 4 | CONSTANT TERM |
|---|---|---|---|---|---|
| USER 1 | -0.4 | 1.3 | 0.2 | 4.1 | -2.1 |
| USER 2 | 1.2 | 0.5 | 2.1 | 5.7 | -3.3 |
| USER 3 | 3.5 | 2.1 | -2.9 | -0.6 | 3.1 |
| ... | | | | | |

FIG.10

| USER | PARAMETER | | | | CONSTANT TERM |
|---|---|---|---|---|---|
| | 1 | 2 | 3 | 4 | |
| USER 1 | 0.13 | 1.03 | 0.83 | 4.63 | -2.50 |
| USER 2 | 1.2 | 0.5 | 2.1 | 5.7 | -3.3 |
| USER 3 | 3.5 | 2.1 | -2.9 | -0.6 | 3.1 |
| ... | | | | | |

FIG.11

| CONTENT | FEATURE QUANTITY | | | |
|---|---|---|---|---|
| | 1 | 2 | 3 | 4 |
| CONTENT 1 | 1.6 | 0.7 | 3.3 | 0.4 |
| CONTENT 2 | -1.4 | 0.9 | -0.7 | 3.1 |
| CONTENT 3 | 2.5 | -3.8 | -0.1 | -2.4 |
| ... | | | | |

INFORMATION PROCESSING APPARATUS, INFORMATION PROCESSING METHOD, AND PROGRAM

BACKGROUND

The present disclosure relates to an information processing apparatus, an information processing method, and a program. More particularly, the disclosure relates to an information processing apparatus, an information processing method, and a program for predicting an evaluation by a user regarding content.

In recent years, there have been growing opportunities for general users to express their opinions on diverse events and matters by use of such Internet-based services as blogs, SNS (Social Networking Service), and Twitter (registered trademark).

Techniques have been proposed to extract, from the information expressed linguistically by such users (called the linguistic expressions hereunder), expressions representing the evaluations of a specific event or matter (called the evaluation expressions hereunder). One such technique is disclosed by N. Kobayashi et al. in "Opinion Mining from Web Documents: Extraction and Structurization," Journal of the Japanese Society for Artificial Intelligence, Vol. 22, No. 2, pp. 227-238, 2007 (called the non-patent document 1 hereunder).

Also, there have been proposed techniques to determine whether a given linguistic expression is positive or negative. One such technique is disclosed by T. Nasukawa et al. in "Sentiment Analysis: Capturing Favorability Using Natural Language Processing," Proceedings of International Conference on Knowledge Capture, 2003 (called the non-patent document 2 hereunder).

SUMMARY

For example, the techniques disclosed in the above-cited non-patent documents 1 and 2 may be used to estimate the taste of a given user and thereby predict his or her evaluations on various contents. However, it may not be possible to acquire sufficient quantities of evaluation expressions given directly by the individual users. That means the accuracy of evaluation predictions about the contents can deteriorate.

The present disclosure has been made in view of the above circumstances and provides an information processing apparatus, an information processing method, and a program for improving the accuracy in predicting the evaluations by users on content based on linguistic expressions.

According to one embodiment of the present disclosure, there is provided an information processing apparatus including: an evaluation information extraction section configured to extract evaluation information including an object targeted to be evaluated and an evaluation of the object targeted to be evaluated from a linguistic expression given as information expressed linguistically by a user of interest; an identification section configured to identify whether the evaluation information is of a first type regarding content or of a second type regarding another user; and an evaluation prediction section configured to predict the evaluation by the user of interest regarding the content, based on the evaluation information of the first type given by the user of interest and on the evaluation information given by the other user in the evaluation information of the second type given by the user of interest.

Preferably, the evaluation information of the second type may include the evaluation information in which the linguistic expression given by the other user is targeted to be evaluated; and the evaluation prediction section may predict the evaluation by the user of interest regarding the content, based on the evaluation information of the first type given the user of interest and on the evaluation information included in the linguistic expression given by the other user targeted to be evaluated in the evaluation information of the second type given by the user of interest.

Preferably, the evaluation information of the second type may include the evaluation information in which the other user is targeted to be evaluated; and the evaluation prediction section may predict the evaluation by the user of interest regarding the content, based on the evaluation information of the first type given by the user of interest and on the evaluation information given by the other user targeted to be evaluated in the evaluation information of the second type given by the user of interest.

Preferably, the evaluation prediction section may include: an estimation section configured to estimate a parameter for use in the evaluation prediction of the content by the user of interest, based on the evaluation information of the first type given by the user of interest and on the evaluation information given by the other user in the evaluation information of the second type given by the user of interest; and a prediction section configured to predict the evaluation by the user of interest regarding the content based on the parameter of the user of interest.

Preferably, the prediction section may set as the parameter of the user of interest the value obtained by a weighted addition of the parameter of the user of interest and the parameter of the other user evaluated positively by the user of interest.

Preferably, the prediction section may estimate the parameter of the user of interest by sharing a prior distribution of the parameter between the user of interest and the other user evaluated positively by the user of interest.

Preferably, the prediction section may predict the evaluation by the user of interest regarding the content by use of the parameter of the other user evaluated positively by the user of interest.

According to another embodiment of the present disclosure, there is provided an information processing method for use with an information processing apparatus for predicting an evaluation of content by a user of interest, the information processing method including: extracting evaluation information including an object targeted to be evaluated and an evaluation of the object targeted to be evaluated from a linguistic expression given as information expressed linguistically by the user of interest; identifying whether the evaluation information is of a first type regarding the content or of a second type regarding another user; and predicting the evaluation by the user of interest regarding the content, based on the evaluation information of the first type given by the user of interest and on the evaluation information given by the other user in the evaluation information of the second type given by the user of interest.

According to a further embodiment of the present disclosure, there is provided a program for causing a computer to execute a process including: extracting evaluation information including an object targeted to be evaluated and an evaluation of the object targeted to be evaluated from a linguistic expression given as information expressed linguistically by the user of interest; identifying whether the evaluation information is of a first type regarding content or of a second type regarding another user; and predicting the evaluation by the user of interest regarding the content, based on the evaluation information of the first type given by the user of interest and on the evaluation information given by the other user in the evaluation information of the second type given by the user of interest.

According to the present disclosure outlined above, evaluation information including an object targeted to be evaluated and an evaluation of the object targeted to be evaluated is extracted from a linguistic expression given as information expressed linguistically by a user of interest. A determination is made to identify whether the evaluation information is of a first type regarding content or of a second type regarding another user. The evaluation by the user of interest regarding the content is predicted based on the evaluation information of the first type given by the user of interest and on the evaluation information given by the other user in the evaluation information of the second type given by the user of interest.

Where any one of the embodiments of the disclosure is implemented, it is possible to predict an evaluation of content by the user of interest based on linguistic expressions. Also, the embodiments of the disclosure can improve the accuracy of the prediction.

DETAILED DESCRIPTION OF THE PREFERRED EMBODIMENTS

Some preferred embodiments of the present disclosure will now be described under the following headings:
1. Embodiments; and
2. Variations.
<1. Embodiments>
[Typical Configuration of the Information Processing System]

Figure 1:
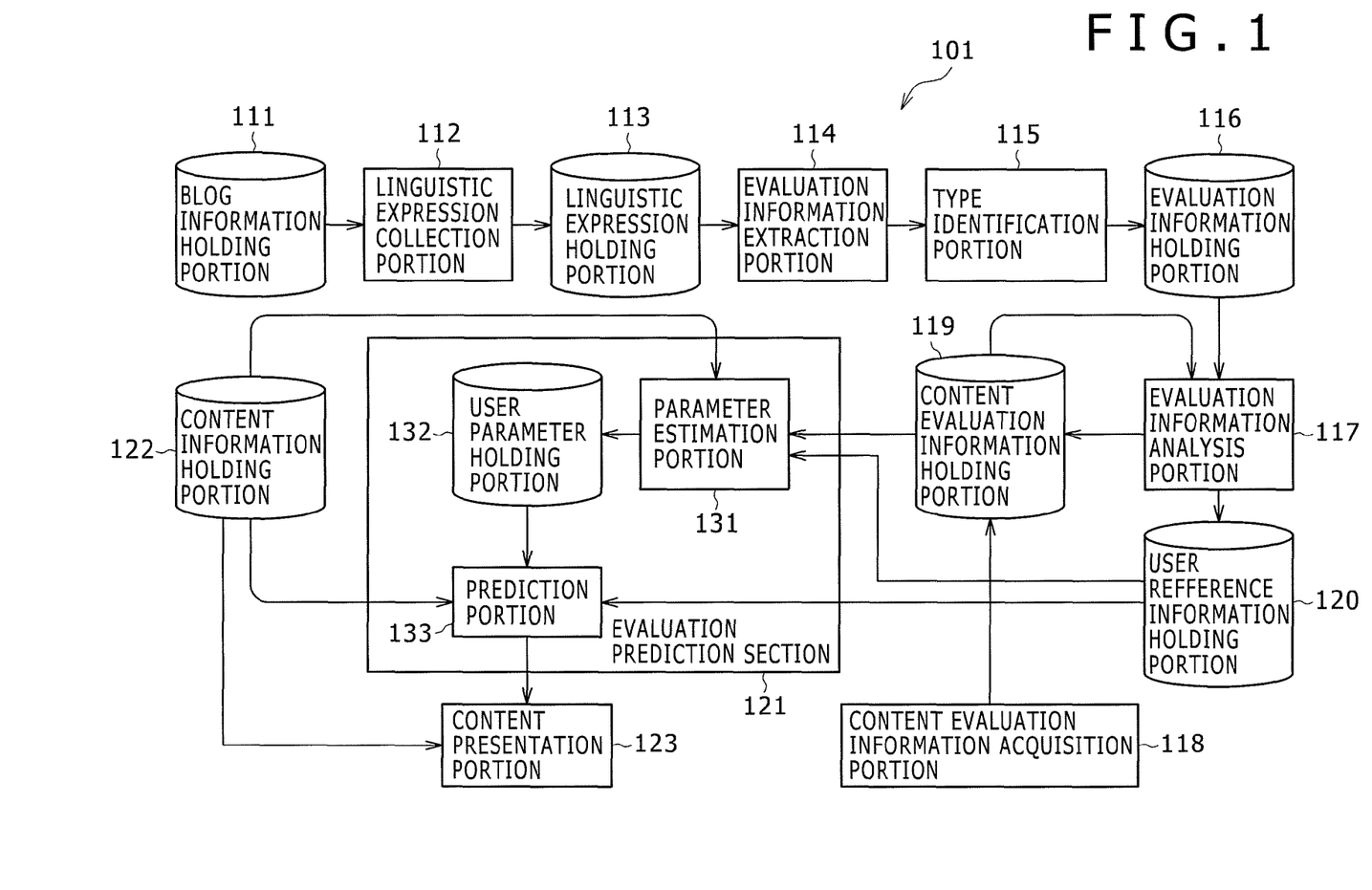
FIG. 1 is a block diagram showing a typical configuration of an information processing system as an embodiment of the present disclosure.

FIG. 1 is a block diagram showing a typical configuration of an information processing system 101 as an embodiment of the present disclosure. For example, the information processing system 101 is made up of a computer, a server, a storage device, and a communication device. The information processing system 101 collects evaluation information given by individual users about contents via networks such as the Internet (not shown) and, based on the collected evaluation information, learns to predict evaluations by the users on the contents. On the basis of the result of the learning, the information processing system 101 predicts the evaluations that may be given by the users on the contents and recommends contents to the users via the network.

In the current context, the contents refer to picture data, moving image data, music data, various products, and document data, among others. The contents are not limited specifically by type.

The information processing system 101 is structured to include a blog information holding portion 111, a linguistic expression collection portion 112, a linguistic expression holding portion 113, an evaluation information extraction portion 114, a type identification portion 115, an evaluation information holding portion 116, an evaluation information analysis portion 117, a content evaluation information acquisition portion 118, a content evaluation information holding portion 119, a user reference information holding portion 120, an evaluation prediction section 121, a content information holding portion 122, and a content presentation portion 123. The evaluation prediction section 121 is structured to include a parameter estimation portion 131, a user parameter holding portion 132, and a prediction portion 133.

The blog information holding portion 111, linguistic expression holding portion 113, evaluation information holding portion 116, content evaluation information holding portion 119, user reference information holding portion 120, content information holding portion 122, and user parameter holding portion 132 are constituted by various storage devices such as hard disk drives or flash memories. The blog information holding portion 111, linguistic expression holding portion 113, evaluation information holding portion 116, content evaluation information holding portion 119, user reference information holding portion 120, content information holding portion 122, and user parameter holding portion 132 may each be structured by a different storage device or may be constituted in part or in all by the same storage device.

The linguistic expression collection portion 112 acquires blog information, to be discussed later in reference to FIG. 4, from the blog information holding portion 111. The linguistic expression collection portion 112 accesses the blogs of various users registered in the blog information via the network (not shown) so as to collect the linguistic expressions given by the users. The linguistic expression collection portion 112 stores linguistic expression information including the collected linguistic expressions into the linguistic expression holding portion 113.

In the current context, the linguistic expressions refer to information expressed by characters or by voice such as text data or audio data.

From the linguistic expressions stored in the linguistic expression holding portion 113, the evaluation information extraction portion 114 extracts evaluation information including the evaluations of various events or matters targeted to be evaluated. The evaluation information extraction portion 114 supplies the extracted evaluation information to the type identification portion 115.

The type identification portion 115 identifies the type of the object evaluated in the evaluation information (called the object type hereunder). The type identification portion 115 stores the evaluation information together with the identified object type into the evaluation information holding portion 116.

The evaluation information analysis portion 117 analyzes the evaluation information held in the evaluation information holding portion 116. Based on the result of the analysis, the evaluation information analysis portion 117 generates content evaluation information representing the evaluations by individual users on contents and stores the generated content evaluation information into the content evaluation information holding portion 119. Also based on the result of the analysis, the evaluation information analysis portion 117 generates user reference information representing the evaluations by each user on other users and stores the generated user reference information into the user reference information holding portion 120.

The content evaluation information acquisition portion 118 acquires externally input content evaluation information and stores it into the content evaluation information holding portion 119.

The evaluation prediction section 121 learns to predict evaluations by each user on contents. Based on the result of the learning, the evaluation prediction section 121 predicts the evaluations that may be made by each user on contents.

More specifically, the parameter estimation portion 131 of the evaluation prediction section 121 acquires the content evaluation information from the content evaluation information holding portion 119 and the user reference information from the user reference information holding portion 120. Based on the content evaluation information and user reference information thus acquired, the parameter estimation portion 131 learns to predict evaluations by each user on contents by use of a suitable learning technique. Also, the parameter estimation portion 131 stores the parameters of each user representing the result of the learning into the user parameter holding portion 132.

The prediction portion 133 acquires the parameters of each user from the user parameter holding portion 132 and a feature quantity of each content from the content information holding portion 122. Based on the parameters of each user and on the feature quantity of each content, the prediction portion 133 predicts the evaluation that may be made by each user on each content and supplies the result of the prediction to the content presentation portion 123.

The content information holding portion 122 stores information about various contents including their feature quantities. Alternatively, the information about the contents as well as the contents themselves may be stored in the content information holding portion 122.

Based on the predicted evaluation by each user regarding each content, the content presentation portion 123 acquires from the content information holding portion 122 the information about the content to be recommended to each user.

[Content Recommendation Process]

A content recommendation process performed by the information processing system 101 is explained below in reference to the flowcharts of FIGS. 2 and 3. As needed, FIGS. 4 through 11 will be referenced for specific examples in the explanation.

In step S1, the linguistic expression collection portion 112 collects linguistic expressions. Specifically, the linguistic expression collection portion 112 first acquires blog information from the blog information holding portion 111.

Figure 4:
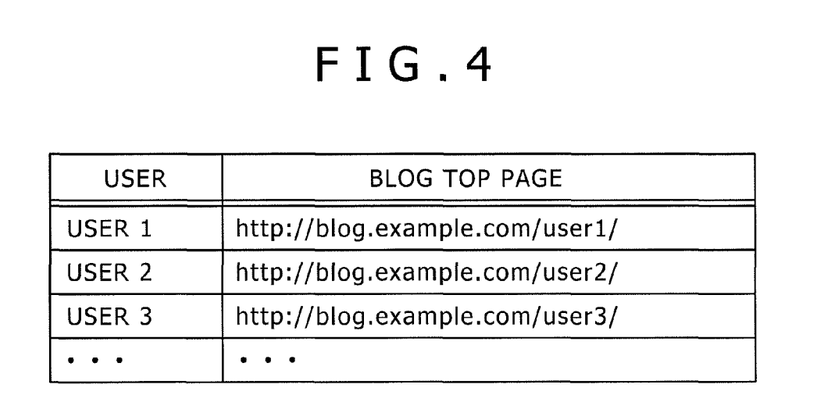
FIG. 4 is a tabular view showing an example of blog information.

FIG. 4 shows an example of blog information. The blog information is made up of registrations of the blogs targeted for the collection of linguistic expressions. For example, the blog information includes users who set up blogs targeted for the collection and the URL (Uniform Resource Locator) of the top page of the blog of each user. For example, the blog which was set up by user 1 and which has its top page represented by the URL "http://blog.example.com/user1/entry-1.html." is shown registered in the first record in FIG. 4.

Via the network (not shown), the linguistic expression collection portion 112 accesses the blog of each user registered in the blog information. Then based on the format of each blog service, the linguistic expression collection portion 112 collects and edits the articles carried by the blogs before extracting therefrom only the linguistic expressions necessary for subsequent processing. The linguistic expression collection portion 112 proceeds to store linguistic expression information including the extracted linguistic expressions into the linguistic expression holding portion 113.

Figure 5:
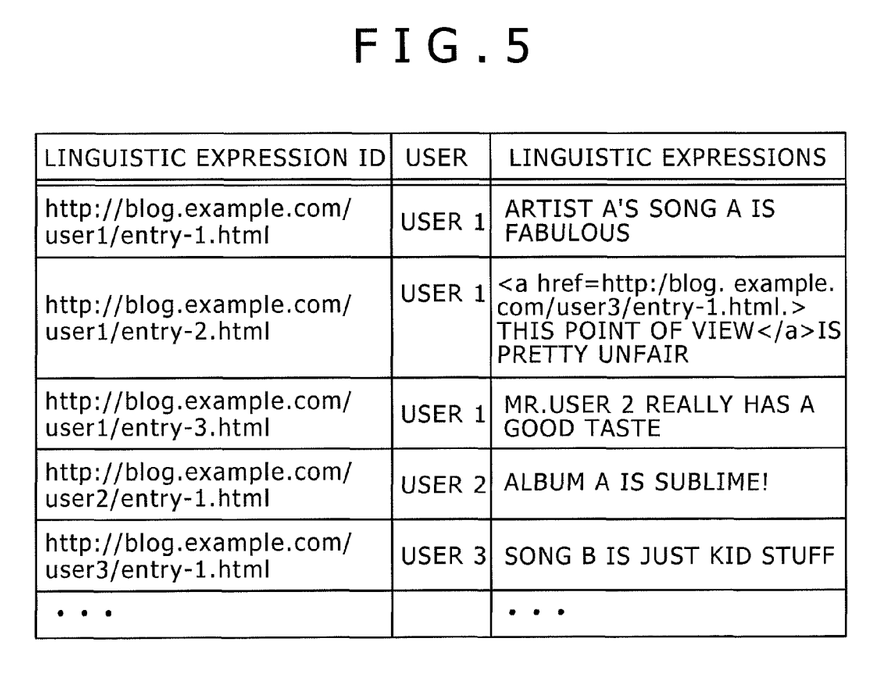
FIG. 5 is a tabular view showing an example of linguistic expression information.

FIG. 5 shows an example of linguistic expression information. For example, the linguistic expression information includes linguistic expression ID's for identifying individual linguistic expressions, the users who originated the linguistic expressions, and the linguistic expressions. In the example of FIG. 5, the URL's of the websites (blog pages) from which the linguistic expressions have been extracted are used as linguistic expression ID's.

For example, the linguistic expression "Artist A's song A is fabulous" originated by user 1 is shown registered in the first record in FIG. 5. Also, the URL "http://blog.example.com/user1/entry-1.html" of the blog page of user 1 whose linguistic expression has been extracted is shown registered as a linguistic expression ID.

If a linguistic expression includes information with links to other websites, the link information should preferably be left intact in consideration of subsequent processing. For example, the second record in FIG. 5 is shown to include link information that is enclosed by anchor tags <a href="http://blog.example.com/user3/entry-1.html">~</a> and left intact.

Figure 2:
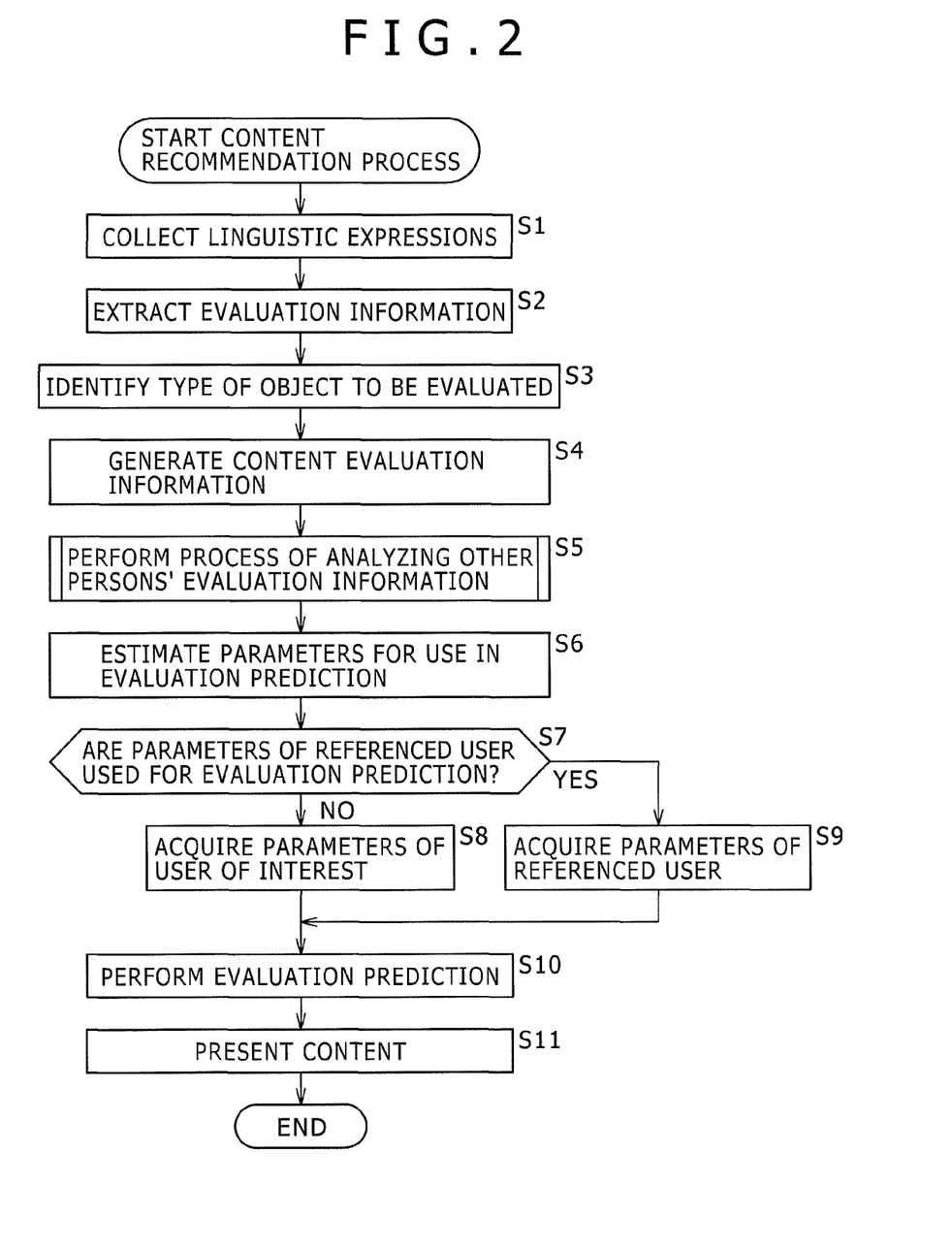
FIG. 2 is a flowchart explanatory of a content recommendation process performed by the information processing system.

In step S2 back in FIG. 2, the evaluation information extraction portion 114 extracts evaluation information from the linguistic expression information held in the linguistic expression holding portion 113.

Figure 6:
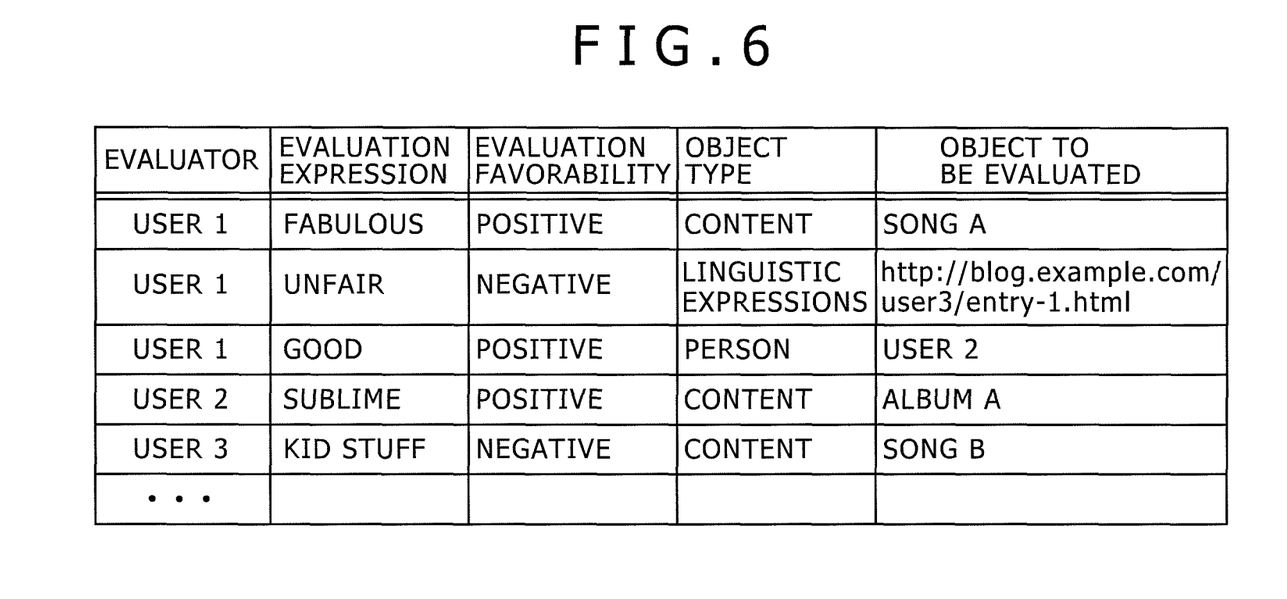
FIG. 6 is a tabular view showing an example of evaluation information.

FIG. 6 shows an example of evaluation information. For example, the evaluation information may include evaluators, evaluation expressions, evaluation favorability, object types, and objects to be evaluated.

By analyzing each of the linguistic expressions included in the linguistic expression information held in the linguistic expression holding portion 113, the evaluation information extraction portion 114 extracts from each linguistic expression an evaluation expression and the object for evaluation in that evaluation expression. Also, the evaluation information extraction portion 114 determines whether the favorability of the extracted evaluation expression (called the evaluation favorability hereunder) is positive or negative. As a typical technique for extracting the evaluation expressions and evaluation objects and for determining the evaluation favorability, it is possible to adopt the technique described in the above-cited non-patent document 2, among others.

The evaluation information extraction portion 114 proceeds to supply the evaluation information including the evaluators, evaluation expressions, evaluation favorability, and evaluation objects to the type identification portion 115. Each user who originated the linguistic expression from which evaluation information was extracted is set as the evaluator of the evaluation information in question.

In step S3, the type identification portion 115 identifies the type of the evaluation object (i.e., object type). Specifically, the evaluation information extraction portion 114 identifies whether the object type is a content that ultimately serves as a unit to be recommended to the user, a linguistic expression given by another user, or a person (i.e., another user).

For example, the type identification portion 115 identifies the object type through the use of dictionaries in which artist names and song names are registered, of user registration information where users' names or nicknames are registered, of rules by which to determine whether a given expression is enclosed by quotation marks (" "), and of a technique for extracting named entities. Typical techniques for extracting named entities are discussed in detail in Japanese Patent Publication No. 4200645 and by Erik F. Tjong et al. in "Introduction to the CoNLL-2003 Shared Task: Language-Independent Named Entity Recognition," CoNLL, 2003.

Also, if the object targeted to be evaluated is enclosed by anchor tags (a href= . . . >~</A>, etc.) with a link, the type identification portion 115 identifies whether the object type is content or a linguistic expression, based on the domain name dictionaries and on the domain name of the URL of the link destination. For example, if the domain name is that of a video posting site, then the object type may be classified as content (i.e., video). This method may also be applied where the object targeted to be evaluated is the URL of the page of a given website.

As another example, the type identification portion 115 may perform a learning process of a suitable technique to identify the object type based on the content of an anchor text.

As a further example, if the object targeted to be evaluated is image data, the type identification portion 115 may perform a learning process of a suitable technique to identify the object type based on the content of a text embedded in the image data.

As described above, the type identification portion 115 identifies whether each item of evaluation information pertains to content (i.e., the object type is content) or to another user (i.e., the object type is a linguistic expression or a person). The type identification portion 115 further identifies whether the evaluation information about the other user pertains to a linguistic expression given by the other user (i.e., the object type is a linguistic expression) or to the other user himself or herself (the object type is a person).

The foregoing description has given only examples of the technique of identifying the object type. The object type identification technique is not limited to what was discussed above. Some other suitable technique may be adopted instead.

The type identification portion 115 stores the evaluation information together with the object type into the evaluation information holding portion 116. If the object type does not correspond to any content, linguistic expression or person, the type identification portion 115 discards the evaluation information and will not store it into the evaluation information holding portion 116.

For example, from the linguistic expression "Artist A's song A is fabulous" in the first record of FIG. 5, a linguistic expression "fabulous" is extracted as the evaluation expression and "song A" is extracted as the evaluation object through the above-described processing of steps S2 and S3. Also, the evaluation favorability of the evaluation expression "fabulous" is determined to be positive, and the object type of the evaluation object "song A" is classified as content. In this manner, the first record in FIG. 6 is generated as evaluation information that includes the evaluator "user 1," evaluation expression "fabulous," evaluation favorability "positive," object type "content," and evaluation object "song A."

As another example, from the linguistic expression "<a href-http://blog.example.com/user3/entry-1.html> This point of view</a> is pretty unfair" in the second record in FIG. 5, a linguistic expression "unfair" is extracted as the evaluation expression. In the text of the linguistic expression of this record, the evaluation target is "this point of view," which is a character string enclosed by anchor tags with a link. Thus in practice the URL "http://blog.example.com/user3/entry-1.html" is extracted as the evaluation target. Also, the evaluation favorability of the evaluation expression "unfair" is determined to be negative, and the object type of the evaluation object "http://blog.example.com/user3/entry-1.html" is classified as linguistic expression. In this manner, the second record in FIG. 6 is generated as evaluation information that includes the evaluator "user 1," evaluation expression "unfair," evaluation favorability "negative," object type "linguistic expression," and evaluation object "http://blog.example.com/user3/entry-1.html."

As another example, from the linguistic expression "Mr. user 2 really has a good taste" in the third record of FIG. 5, a linguistic expression "good" is extracted as the evaluation expression and "Mr. user 2" is extracted as the evaluation object. Also, the evaluation favorability of the evaluation expression "good" is determined to be positive, and the object type of the evaluation object "Mr. user 2" is classified as person. In this manner, the third record in FIG. 6 is generated as evaluation information that includes the evaluator "user 1," evaluation expression "good," evaluation favorability "positive," object type "person," and evaluation object "Mr. user 2."

In like manner, the evaluation information of the fourth record and that of the fifth record in FIG. 6 are generated from the linguistic expression information of the fourth record and that of the fifth record in FIG. 5, respectively.

In step S4 back in FIG. 2, the evaluation information analysis portion 117 generates content evaluation information. Specifically, the evaluation information analysis portion 117 extracts evaluation information of which the object type is content from the evaluation information held in the evaluation information holding portion 116. Based on the extracted evaluation information, the evaluation information analysis portion 117 generates the content evaluation information.

Figure 7:
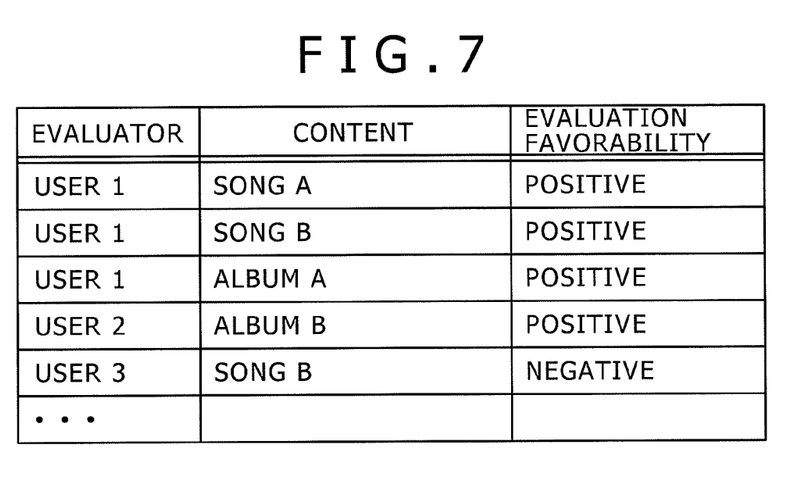
FIG. 7 is a tabular view showing an example of content evaluation information.

FIG. 7 shows an example of content evaluation information. The content evaluation information may typically include evaluators, contents that serve as the targets to be evaluated, and evaluation favorability. For example, based on the evaluation information of the first record in FIG. 6, the first record in FIG. 7 is generated as the content evaluation information that includes the evaluator "user 1," content "song A," and evaluation favorability "positive." That is, what is generated here is the content evaluation information indicating that user 1 evaluates song A positively. Likewise, based on the evaluation information of the fourth record and that of the fifth record in FIG. 6, the content evaluation information of the fourth record and that of the fifth record in FIG. 7 are generated respectively. The evaluation information analysis portion 117 stores the content evaluation information thus generated into the content evaluation information holding portion 119.

In step S5, the evaluation information analysis portion 117 performs the process of analyzing other persons' evaluation information. The other-person evaluation information analysis process is explained below in detail in reference to the flowchart of FIG. 3.

Figure 3:
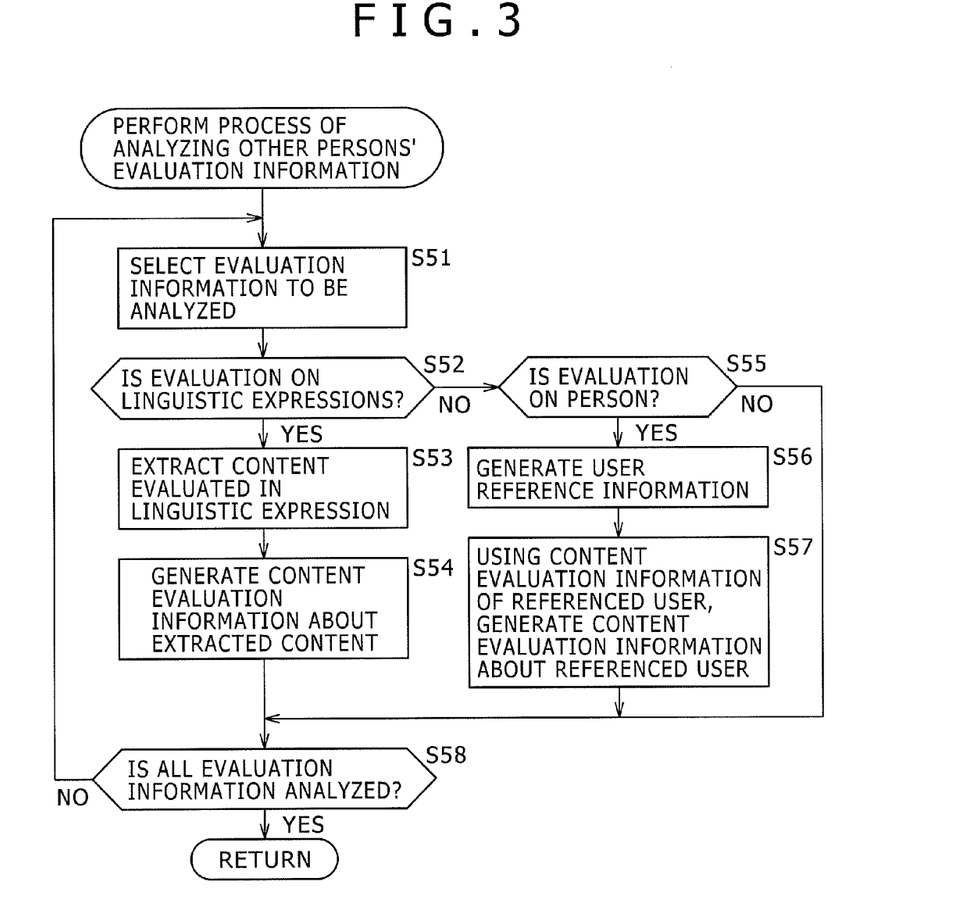
FIG. 3 is a flowchart explanatory of detailed steps of the process of analyzing other persons' evaluation information.

In step S51 of FIG. 3, from the evaluation information held in the evaluation information holding portion 116, the evaluation information analysis portion 117 selects the evaluation information to be analyzed. For example, the evaluation information analysis portion 117 may select successively the evaluation information starting from the first record in FIG. 6.

In step S52, based on the target type of the evaluation information to be analyzed, the evaluation information analysis portion 117 determines whether the evaluation is on linguistic expressions. If it is determined that the evaluation is on linguistic expressions, control is passed on to step ST53.

In step S53, the evaluation information analysis portion 117 extracts the content being evaluated in the linguistic expression. Here, consider the case of evaluating the evaluation information of the second record in FIG. 6 of which the target type is linguistic expression.

For example, through the same processing as that of step S1 in FIG. 2 discussed above, the evaluation information analysis portion 117 may extract the linguistic expression "Song B is just kid stuff" from the article posted at "http://blog.example.com/user3/entry-1.html," which is the evaluation object of the evaluation information in question. Then through the same processing as that of step S2 in FIG. 2 discussed above, the evaluation information analysis portion 117 extracts the content "song B" being evaluated in the linguistic expression.

In this case, the preceding step may be omitted because the content "song B" was already extracted from the linguistic expression of interest in steps S1 and S2 carried out earlier.

If the evaluation object being evaluated in the linguistic expression is another linguistic expression, the evaluation information analysis portion 117 proceeds to extract the content evaluated in that other linguistic expression.

In step S54, the evaluation information analysis portion 117 generates content evaluation information about the extracted content.

In this case, for example, user 1 evaluates negatively user 3's linguistic expression, and user 3 evaluates negatively song B in his or her linguistic expression. It may follow that user 1 is considered positively evaluating song B in indirect fashion.

The evaluation information analysis portion 117 thus generates the second record 2 in FIG. 7 as the content evaluation information that includes the evaluator "user 1," content "song B," and evaluation favorability "positive." The evaluation information analysis portion 117 stores the generated content evaluation information into the content evaluation information holding portion 119. Thereafter, control is passed on to step S58.

In the manner described above, based on the evaluation by user 1 regarding user 3's linguistic expression, it is possible to estimate the evaluation of user 1 regarding song B being evaluated in user 3's linguistic expression and to generate the content evaluation information denoting the result of the estimation, which is then stored.

If in step S52 the evaluation is determined not to be on linguistic expressions, control is passed on to step S55.

In step S55, based on the target type of the evaluation information to be analyzed, the evaluation information analysis portion 117 determines whether the evaluation is on a person. If it is determined that the evaluation is on a person, control is passed on to step S56.

In step S56, the evaluation information analysis portion 117 stores the user reference information. Here, consider the case of analyzing the evaluation information of the third record in FIG. 6 of which the target type is a person.

Figure 8:
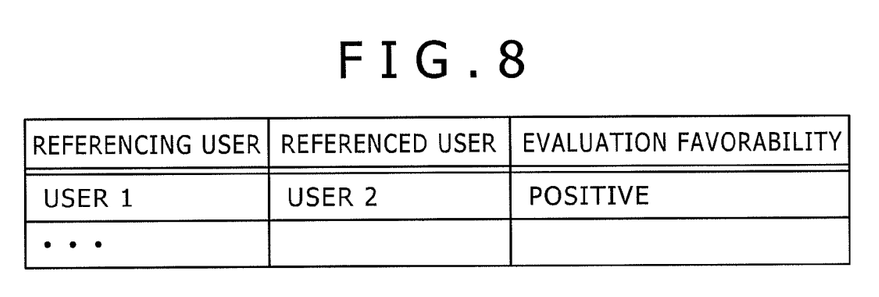
FIG. 8 is a tabular view showing an example of user reference information.

FIG. 8 shows an example of user reference information. The user reference information may typically include referencing users, referenced users, and evaluation favorability. For example, in the evaluation information of the third record in FIG. 6, user 1 evaluates user 2 positively. Thus the evaluation information analysis portion 117 generates the first record in FIG. 8 as the user reference information that includes the referencing user "user 1," referenced user "user 2," and evaluation favorability "positive." That is, the user reference information generated here indicates the "positive" evaluation favorability of the referencing user "user 1" serving as the evaluator evaluating the referenced user "user 2" as the evaluation object. The evaluation information analysis portion 117 stores the generated user reference information into the user reference information holding portion 120.

In step S57, the evaluation information analysis portion 117 generates the content evaluation information of the referencing user by utilizing the content evaluation information of the referenced user. In this case, for example, user 1 as the referencing user positively evaluates user 2 as the referenced user. Thus it is possible to generate the content evaluation information of user 1 using the content evaluation information of user 2 unmodified. That is, the evaluation information analysis portion 117 generates the content evaluation information of user 1 by copying the fourth content evaluation information in FIG. 7 in which user 2 is the evaluator and by substituting user 1 for the evaluator. In this manner, the third record in FIG. 7 is generated as the content evaluation information that includes the evaluator "user 1," content "album 1," and evaluation favorability "positive."

If user 1's evaluation of user 2 is negative in this case, then the evaluation favorability need only be reversed.

The evaluation information analysis portion 117 proceeds to store the generated content evaluation information into the content evaluation information holding portion 119. Control is then passed on to step S58.

If in step S55 the evaluation is determined not to be on a person, i.e., if the evaluation is determined to be on content, then steps S56 and S57 are skipped and step S58 is reached. That is, the evaluation information of which the object type is content will not be generated anew because the content evaluation information was already generated through the above-described processing of step S4 in FIG. 2.

In step S58, the evaluation information analysis portion 117 determines whether all evaluation information has been analyzed. If not all evaluation information has been evaluated yet, control is returned to step S51. Steps S51 through S58 are then repeated until all evaluation information is determined to have been analyzed in step S58.

If in step S58 all evaluation information is determined to have been analyzed, the other-person evaluation information analysis process is brought to an end.

In the manner described above, the content evaluation information of a given user is generated based on the evaluation information of another user evaluated by the user in question, and the generated content evaluation information is stored.

In step S6 back in FIG. 2, the parameter estimation portion 131 estimates parameters for use in predicting the evaluation by each user regarding contents.

Generally, the techniques of evaluation prediction for content recommendation fall into two categories: collaborative filtering (CF), and content-based filtering P (CBF). Well-known techniques in the first category are based on matrix decomposition, such as those described in U.S. Patent Application Publication No. 2010/0030764 and discussed by Yehuda Koren in "Factorization Meets the Neighborhood: a Multifaceted Collaborative Filtering Model," Proceedings of International Conference on Knowledge Discovery and Data Mining, 2008. Oft-used techniques in the second category above are pattern recognition techniques such as SVM (Support Vector Machine).

Any of the techniques mentioned above may be used to deal with the task of estimating the parameters regarding each user or each content based on given data (in this context, the given data is the information of evaluations by users on content as well as the information composed of the contents themselves).

Explained below as a typical learning technique is CBF using logistic regression. A detailed description of the technique of CBF that uses logistic regression may be found, for example, in "Pattern Recognition and Machine Learning" by C. M. Bishop, Springer-Verlag, 2006 (a Japanese version available as "Pattern Recognition and Machine Learning—Statistical Prediction based on Bayesian Theory," translated by Hiroshi Motoda et al., Springer Japan, December 2007; called the non-patent document 5 hereunder)."

Through the use of logistic regression, parameters represented by real-valued vectors that include a weight and a constant term each regarding feature quantities of contents (e.g., genre and keyword; tempo, key and other signal features in the case of music) are learned.

The parameter estimation portion 131 first learns to predict evaluations by individual users on contents based on the content evaluation information held in the content evaluation information holding portion 119. For example, the parameter estimation portion 131 learns to predict the evaluation by user 1 regarding the contents on the basis of the content evaluation information of which the evaluator is user 1 (e.g., the first through the third records in FIG. 6). Also, the parameter estimation portion 131 learns to predict the evaluation by user 2 regarding the contents on the basis of the content evaluation information of which the evaluator is user 2 (e.g., the fourth record in FIG. 6). The parameter estimation portion 131 further learns to predict the evaluation by user 3 regarding the contents on the basis of the content evaluation information of which the evaluator is user 3 (e.g., the fifth record in FIG. 6).

Figure 9:
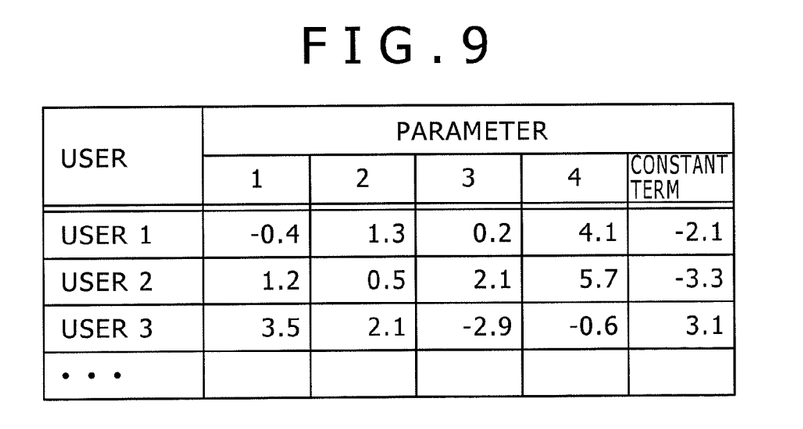
FIG. 9 is a tabular view showing a first example of estimated parameters for use in predictive learning.

FIG. 9 shows an example of the learned predictions of evaluations by individual users on the content having four feature quantities. In this case, five parameters are obtained as a result of the learning: four parameters 1 through 4 regarding the four content feature quantities plus a constant term.

Next, the parameter estimation portion 131 merges the parameters based on the user reference information held in the user reference information holding portion 120. For example, the parameter estimation portion 131 may acquire weighted averages (weighted additional values) of the parameters of a given user and those of the user evaluated positively by the user in question, and may set the acquired weighted averages as the parameters of the user in question.

Figure 10:
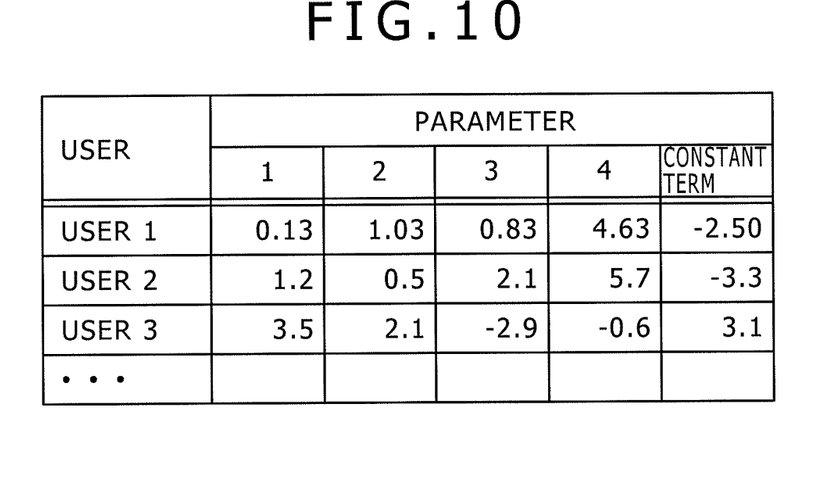
FIG. 10 is a tabular view showing a second example of estimated parameters for use in predictive learning.

For example, user 1 is seen giving a positive evaluation to user 2 in the user reference information of FIG. 8. Thus the parameter estimation portion 131 obtains weighted averages of the parameters of user 1 and those of user 2 in the ratio of, say, 2:1 in order to calculate the parameters of user 1. As a result, the parameters of user 1 are 0.13, 1.03, 0.83, 4.63 and −2.50 as shown in FIG. 10.

If user 1 gives positive evaluations to a plurality of users (e.g., users 2 and 3), then weighted averages of the parameters of user 1 and those of the multiple users are established as the parameters of user 1. Alternatively, weighted averages may be obtained by extracting a predetermined number of users from the positively evaluated multiple users.

As another example, if user 1 gives a plurality of evaluations to a single user (e.g., user 2) and if in this case there are more positive evaluations than negative evaluations in a certain ratio, then the weight for weighted averaging may be determined based on that ratio. On the other hand, if a user is given more negative evaluations than positive evaluations, then the parameters of that user should preferably be not used in weighted averaging.

As a further example, the parameters of user 2 evaluated positively by user 1 may be used unchanged as the parameters of user 1. This arrangement is particularly effective where the degree of confidence in the parameters of user 1 is low because there exists little content evaluation information regarding user 1 while the degree of confidence in the parameters of user 2 is high because there exists much content evaluation information regarding user 2.

Since there is no user reference information of users 2 and 3, the parameters estimated individually for these users are utilized.

The parameter estimation portion 131 then stores into the user parameter holding portion 132 those parameters of individual users which are acquired as a result of the learning process.

As described in the above-cited non-patent document 5, it is well known that the classifiers or the like for classifying contents can be learned accurately using the Bayesian framework of learning for assuming prior distribution of parameters.

The prior distribution may be either shared by all users or retained for each of the users involved. In the former case, granularity is too coarse to permit sufficiency accuracy. In the latter case, prior distribution may not be suitably learned because the number of data is too small. Thus it is conceivable to share prior distribution between users of similar tendencies, as discussed by Kai Yu et al. in "A Nonparametric Hierarchical Bayesian Framework for Information Filtering," Proceedings of the 27th annual international ACM SIGIR conference on research and development in information retrieval, USA, Association for Computing Machinery, 2004, pp. 353-360. Although the selection of users of similar tendencies can be represented by a probability model, the embodiment of the present disclosure makes it possible to learn parameters using, unchanged, the prior distribution of referenced users evaluated positively in the user reference information.

In that case, for example, parameters may be learned for each of the users before the prior distribution to be shared between them is learned. Using the latter process, it is possible to influence the learning of the parameters of any other user with whom the prior distribution is shared.

In step S7 back in FIG. 2, the prediction portion 133 determines whether the parameters of a referenced user are to be used for evaluation prediction. There may be two methods for predicting the evaluation on the content by the user targeted for evaluation prediction (called the user of interest hereunder). One method involves using the parameters of the user of interest; another method involves utilizing the parameters of the referenced user.

For example, if there is no referenced user positively evaluated by the user of interest, then the parameters of the user of interest are used for evaluation prediction. In this case, the prediction portion 133 determines that the parameters of the referenced user will not be used for evaluation prediction.

As another example, if the parameters of the user of interest were obtained through weighted averaging involving the parameters of any other user, then the parameters of the user of interest are used for evaluation prediction. In this case, the prediction portion 133 also determines that the parameters of the referenced user will not be used for evaluation prediction.

As a further example, if there exists a referenced user evaluated positively by the user of interest and if the parameters of the user of interest were estimated individually without recourse to weighted averaging involving the parameters of any other user, then evaluation prediction is performed using the parameters of the referenced user with a probability of $\alpha(0<\alpha\leq1)$, and evaluation prediction is carried out using the parameters of the user of interest with a probability of $1-\alpha$. That is, in this case, the prediction portion 133 determines that the parameters of the referenced user will not be used with the probability $1-\alpha$ for evaluation prediction and that the parameters of the referenced user will be used with the probability $\alpha$ for evaluation prediction.

If there exist a plurality of referenced users positively evaluated by the user of interest, the probability α may be equally divided by the number of the referenced users for example. As another example, a different probability may be set for each of the referenced users involved.

If it is determined in step S7 that the parameters of the referenced user will not be used for evaluation prediction, control is passed on to step S8.

In step S8, the prediction portion 133 acquires the parameters of the user of interest. For example, if user 1 is the user of interest, then the prediction portion 133 acquires the parameters of user 1 from among those of the other users shown in FIG. 9 (or FIG. 10). Thereafter, control is passed on to step S10.

If it is determined in step S7 that the parameters of the referenced user will be used for evaluation prediction, control is passed on to step S9.

In step S9, the prediction portion 133 acquires the parameters of the referenced user. For example, if user 1 is the user of interest, the prediction portion 133 determines that, based on the user reference information in FIG. 8, the referenced user positively evaluated by user 1 is user 2. The prediction portion 133 then acquires the parameters of user 2 from among those of the users shown in FIG. 9 (or FIG. 10). Thereafter, control is passed on to step S10.

In step S10, the prediction portion 133 performs evaluation prediction. Specifically, from among the contents of which the information is stored in the content information holding portion 122, the prediction portion 133 predicts evaluations regarding those contents yet to be evaluated by the user of interest. That is, from among the contents of which the information is held in the content information holding portion 122, the prediction portion 133 predicts evaluations by the user of interest regarding the contents about which the content evaluation information of the user of interest is not stored in the content evaluation information holding portion 119.

For example, the prediction portion 133 may calculate the output value fw(x) of logistic regression based on the following expression (1):

$$fw(x)=1/(1+\exp(-w^T x)) \quad (1)$$

where, "w" denotes the parameter of the user for use in evaluation, and "x" represents the vector giving the feature quantity of the content targeted to be evaluated.

The matrix "x" above includes an element of which the value remains "1" corresponding to the constant term of the parameter.

The prediction portion 133 takes the calculated output value fw(x) as the predicted evaluation value of the user of interest regarding the content in question.

Figure 11:
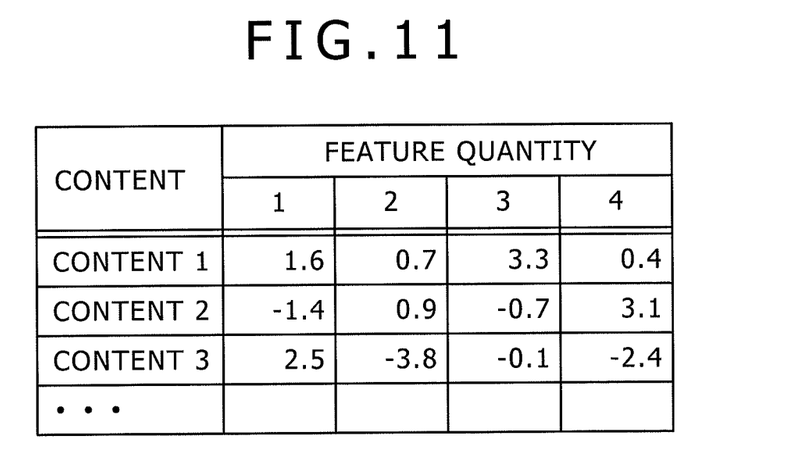
FIG. 11 is a tabular view showing typical feature quantities of contents.

For example, if the parameters of user 1 in FIG. 9 are used for evaluation prediction and if feature quantities 1 through 4 of contents 1 through 3 to be evaluated are set to the values shown in FIG. 11, then the predicted evaluation values fw(x) of user 1 regarding contents 1 through 3 are 0.51, 0.81, and 0.14, respectively.

Also, using the predicted evaluation value fw(x) as the expectation value of Bernoulli distribution, the prediction portion 133 predicts whether the evaluation of the user of interest regarding the content having the feature quantity "x" is positive or negative. The larger the value of the predicted evaluation value fw(x), the higher the probability that the user of interest likes the content in question (i.e., gives it a positive evaluation). Conversely, the smaller the value of the predicted evaluation value fw(x), the higher the probability that the user of interest dislikes the content in question (i.e., gives it a negative evaluation).

The prediction portion 133 supplies the content presentation portion 123 with the predicted evaluation value fw(x) of the user of interest regarding the contents yet to be evaluated.

In step S11, the content presentation portion 123 presents the contents. For example, the content presentation portion 123 may present the top-n contents and acquire information about the extracted contents from the content information holding portion 122. The content presentation portion 123 proceeds to send the acquired information about the contents to, say, an information apparatus (e.g., computer, mobile phone, portable information terminal) owned by the user of interest via a network, not shown. When the information about the extracted contents is displayed on the information apparatus of the user of interest, the contents in question are recommended to that user.

Thereafter, the content recommendation process is brought to an end.

In the manner described above, the evaluations of the user of interest regarding contents are predicted on the basis of the evaluation information of some other user whose linguistic expression was evaluated by the user of interest or who was evaluated by the user of interest, in addition to the evaluation information of the user of interest. Thus the evaluations of the user of interest regarding the contents are predicted based on the evaluation information of a higher degree of confidence than before. As a result, the accuracy in predicting the evaluation by the user of interest regarding the contents is improved, which makes it possible to recommend the contents to the user of interest in better conformity with that user's taste.

<2. Variations>

In the foregoing description, the technique of CBF that uses logistic regression was shown as a typical technique of predicting evaluations regarding contents. Alternatively, any other suitable learning technique may be adopted in implementing the present disclosure. It might be desired to utilize regression techniques for predicting continuous values, such as linear regression or support vector regression instead of the classification techniques such as logistic regression or SVM. In that case, when evaluation favorability is determined in step S2 of FIG. 2, the degree of positive or negative evaluation may be established using adverbial expressions such as "very" and "a little."

In the foregoing description, blogs were shown to be the sources from which to collect linguistic expressions. However, this is not limitative of the present disclosure. Alternatively, other sources such as SNS and Twitter (registered trademark) may be set as the destinations from which linguistic expressions may be gathered.

As another alternative, the learning process may be carried out using not only the content evaluation information extracted from the collected linguistic expressions but also the content evaluation information acquired by the content evaluation information acquisition section 118 from the outside.

The present disclosure may also applied to diverse information processing apparatuses, information processing systems, and software for predicting evaluations by users regarding contents or for recommending contents to users, among other purposes.

[Typical Structure of the Computer]

The series of the processes described above may be executed either by hardware or by software. Where the processes are to be carried out by software, the programs constituting the software are installed into suitable computers for process execution. Such computers include one with the software installed beforehand in its dedicated hardware, and a general-purpose personal computer or like equipment capable of executing diverse functions based on the programs installed therein.

Figure 12:
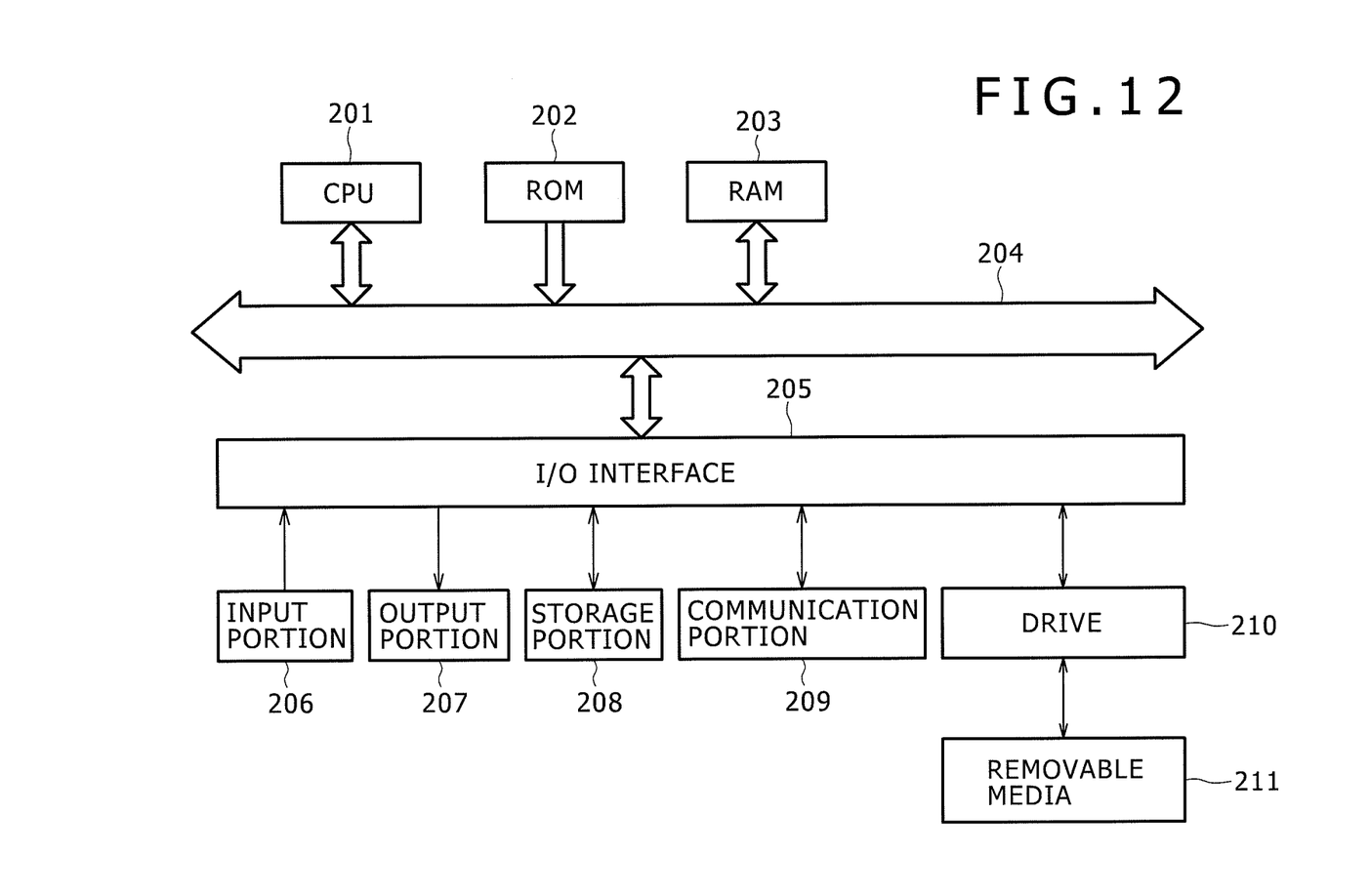
FIG. 12 is a block diagram showing a typical structure of a computer.

FIG. 12 is a block diagram showing a typical structure of a computer for executing the above-described series of the processes using suitable programs.

In the computer, a CPU (central processing unit) 201, a ROM (read only memory) 202, and a RAM (random access memory) 203 are interconnected via a bus 204.

An input/output interface 205 is also connected to the bus 204. The input/output interface 205 is connected with an input portion 206, an output portion 207, a storage portion 208, a communication portion 209, and a drive 210.

The input portion 206 is typically made up of a keyboard, a mouse, and a microphone. The output portion 207 is generally formed by a display and speakers. The storage portion 208 is usually composed of a hard disk or a nonvolatile memory. The communication portion 209 is typically formed by a network interface. The drive 210 drives removable media 211 such as magnetic disks, optical disks, magneto-optical disks, and semiconductor memories.

In the computer structured as outlined above, the CPU 201 may typically execute the above-described series of the processes by loading relevant programs from the storage portion 208 into the RAM 203 via the input/output interface 205 and bus 204 for program execution.

The programs to be executed by the computer (i.e., CPU 201) may be offered recorded on the removable media 211 constituting package media or the like. The programs may also be offered transmitted through wired or wireless transmission media such as local area networks, the Internet, or digital satellite broadcasts.

When a suitable piece of the removable media 211 carrying the relevant programs is attached to the drive 210, the programs can be installed from the attached medium into the storage portion 208 through the input/output interface 205. Alternatively, the programs may be received by the communication portion 209 through wired or wireless transmission media before getting installed into the storage portion 208. As another alternative, the programs may be preinstalled in the ROM 202 or storage portion 208.

Also, the programs for execution by the computer may be processed in the depicted sequence of this specification (i.e., on a time series basis), in parallel, or in otherwise appropriately timed fashion such as when they are invoked.

In this specification, the term "system" refers to an entire configuration made up of a plurality of component devices and elements.

It should be understood by those skilled in the art that various modifications, combinations, sub-combinations and alterations may occur depending on design requirements and other factors in so far as they are within the scope of the appended claims or the equivalents thereof.

The present disclosure contains subject matter related to that disclosed in Japanese Priority Patent Application JP 2010-124183 filed in the Japan Patent Office on May 31, 2010, the entire content of which is hereby incorporated by reference.

What is claimed is:

1. An information processing apparatus comprising:

an evaluation information extraction section configured to extract evaluation information including an object targeted to be evaluated and an evaluation of said object targeted to be evaluated from a linguistic expression given as information expressed linguistically by a user of interest;

an identification section configured to identify whether said evaluation information is of a first type regarding content or of a second type regarding another user; and an evaluation prediction section configured to predict the evaluation by said user of interest regarding said content, based on the evaluation information of said first type given by said user of interest and on the evaluation information given by said other user in the evaluation information of said second type given by said user of interest, wherein said evaluation information of said second type includes said evaluation information in which said linguistic expression given by said other user is targeted to be evaluated; and wherein said evaluation prediction section predicts the evaluation by said user of interest regarding said content, based on said evaluation information of said first type given by said user of interest and on said evaluation information included in said linguistic expression given by said other user targeted to be evaluated in said evaluation information of said second type given by said user of interest.

2. An information processing apparatus comprising:

an evaluation information extraction section configured to extract evaluation information including an object targeted to be evaluated and an evaluation of said object targeted to be evaluated from a linguistic expression given as information expressed linguistically by a user of interest;

an identification section configured to identify whether said evaluation information is of a first type regarding content or of a second type regarding another user; and an evaluation prediction section configured to predict the evaluation by said user of interest regarding said content, based on the evaluation information of said first type given by said user of interest and on the evaluation information given by said other user in the evaluation information of said second type given by said user of interest, wherein said evaluation information of said second type includes said evaluation information in which said other user is targeted to be evaluated; and said evaluation prediction section predicts the evaluation by said user of interest regarding said content, based on said evaluation information of said first type given by said user of interest and on said evaluation information given by said other user targeted to be evaluated in said evaluation information of said second type given by said user of interest.

3. An information processing apparatus comprising:

an evaluation information extraction section configured to extract evaluation information including an object targeted to be evaluated and an evaluation of said object targeted to be evaluated from a linguistic expression given as information expressed linguistically by a user of interest;

an identification section configured to identify whether said evaluation information is of a first type regarding content or of a second type regarding another user; and an evaluation prediction section configured to predict the evaluation by said user of interest regarding said content, based on the evaluation information of said first type given by said user of interest and on the evaluation information given by said other user in the evaluation information of said second type given by said user of interest, wherein said evaluation prediction section comprises:

an estimation section configured to estimate a parameter for use in the evaluation prediction of said content by said user of interest, based on said evaluation information of said first type given by said user of interest and on said evaluation information given by said other user in said evaluation information of said second type given by said user of interest; and a prediction section configured to predict the evaluation by said user of interest regarding said content based on said parameter of said user of interest.

4. The information processing apparatus according to claim 3, wherein said prediction section sets as said parameter of said user of interest the value obtained by a weighted addition of the parameter of said user of interest and the parameter of said other user evaluated positively by said user of interest.

5. The information processing apparatus according to claim 3, wherein said prediction section estimates said parameter of said user of interest by sharing a prior distribution of said parameter between said user of interest and said other user evaluated positively by said user of interest.

6. The information processing apparatus according to claim 3, wherein said prediction section predicts the evaluation by said user of interest regarding said content by use of said parameter of said other user evaluated positively by said user of interest.

7. An information processing method for use with an information processing apparatus for predicting an evaluation of content by a user of interest, said information processing method comprising:

extracting evaluation information including an object targeted to be evaluated and an evaluation of said object targeted to be evaluated from a linguistic expression given as information expressed linguistically by said user of interest;

identifying whether said evaluation information is of a first type regarding said content or of a second type regarding another user; and predicting the evaluation by said user of interest regarding said content, based on the evaluation information of said first type given by said user of interest and on the evaluation information given by said other user in the evaluation information of said second type given by said user of interest, wherein said evaluation information of said second type includes said evaluation information in which said linguistic expression given by said other user is targeted to be evaluated; and wherein predicting the evaluation comprises predicting the evaluation by said user of interest regarding said content, based on said evaluation information of said first type given by said user of interest and on said evaluation information included in said linguistic expression given by said other user targeted to be evaluated in said evaluation information of said second type given by said user of interest.

8. A non-transitory, computer-readable medium comprising instructions for causing a computer to execute a process comprising:

extracting evaluation information including an object targeted to be evaluated and an evaluation of said object targeted to be evaluated from a linguistic expression given as information expressed linguistically by said user of interest;

identifying whether said evaluation information is of a first type regarding content or of a second type regarding another user; and predicting the evaluation by said user of interest regarding said content, based on the evaluation information of said first type given by said user of interest and on the evaluation information given by said other user in the evaluation information of said second type given by said user of interest, wherein predicting the evaluation comprises:

estimating a parameter for use in the evaluation prediction of said content by said user of interest, based on said evaluation information of said first type given by said user of interest and on said evaluation information given by said other user in said evaluation information of said second type given by said user of interest; and predicting the evaluation by said user of interest regarding said content based on said parameter of said user of interest.

* * * * *